C. REINEKE.
REDUCTION AND MULTISTROKE POWER TRANSMITTING MECHANISM.
APPLICATION FILED MAR. 7, 1921.
1,411,517.
Patented Apr. 4, 1922.
5 SHEETS—SHEET 5.
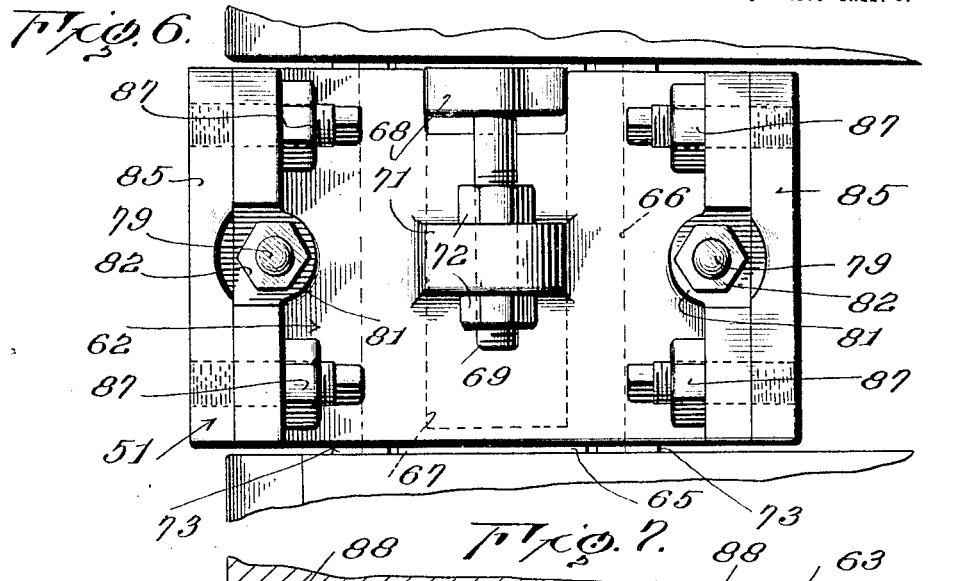
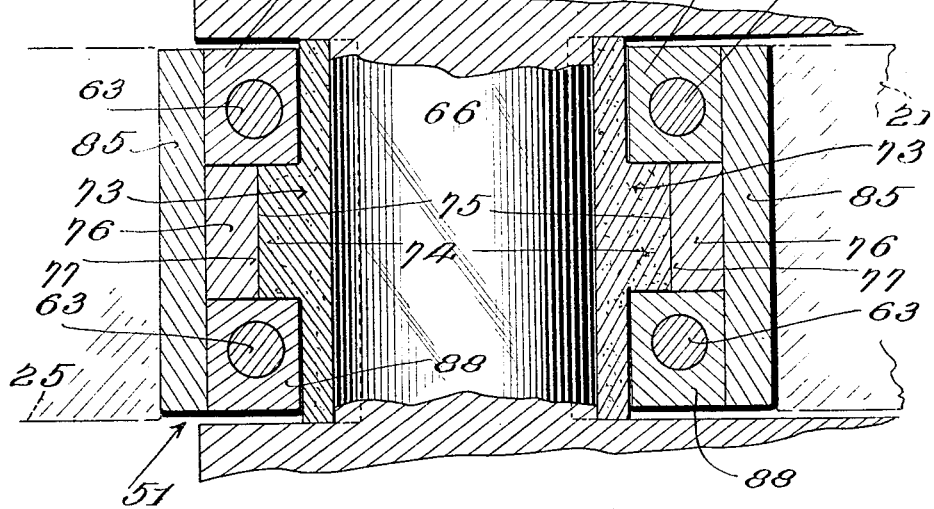
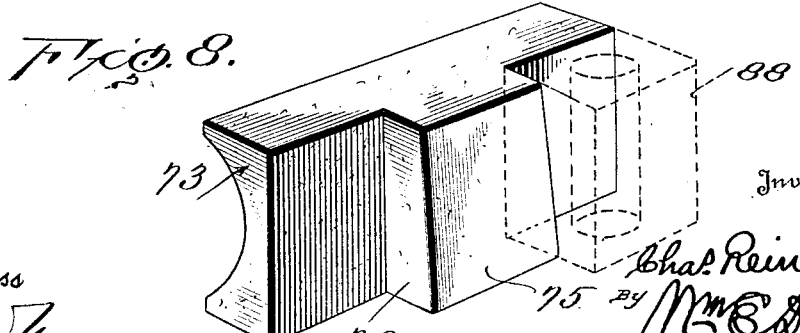

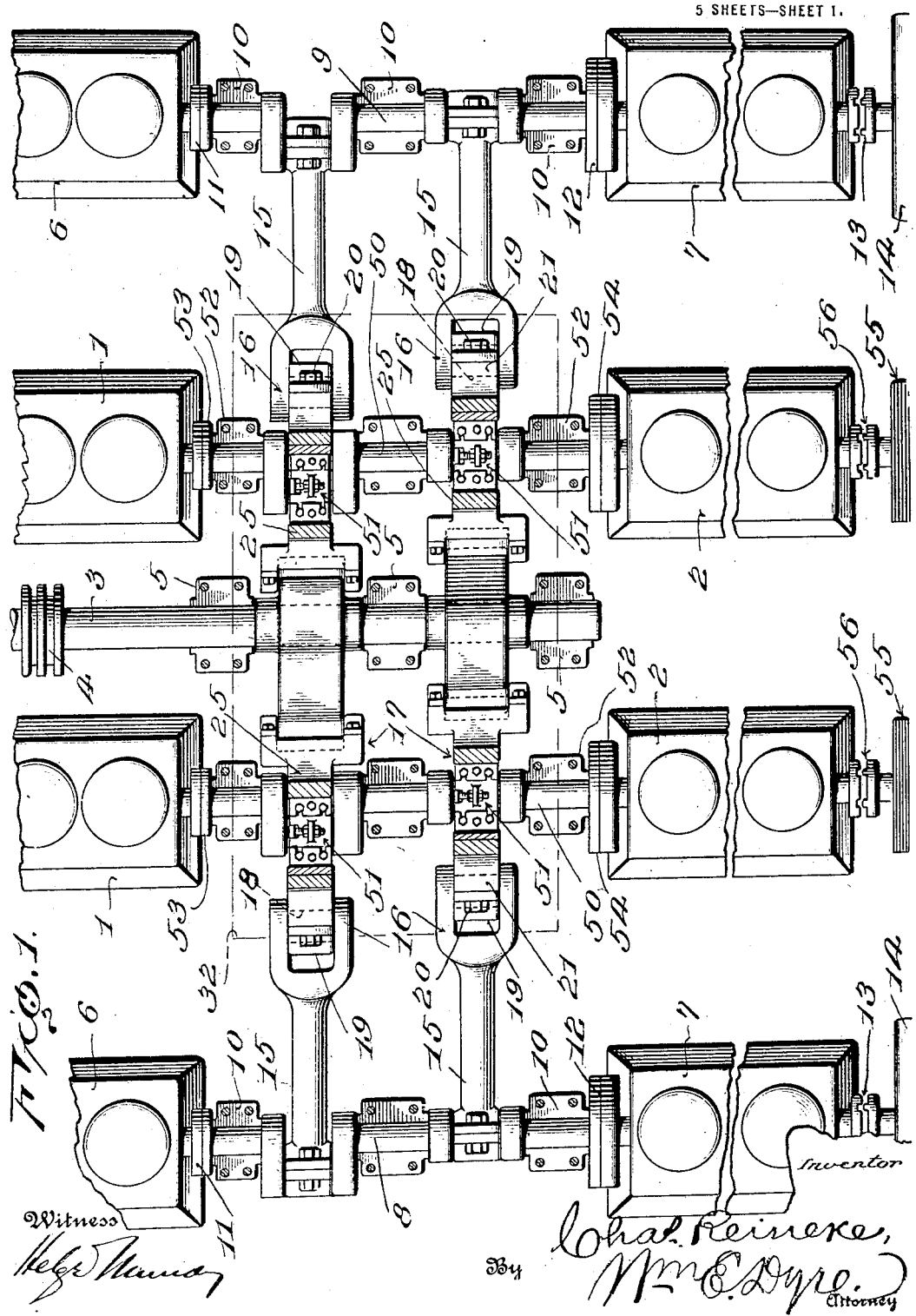

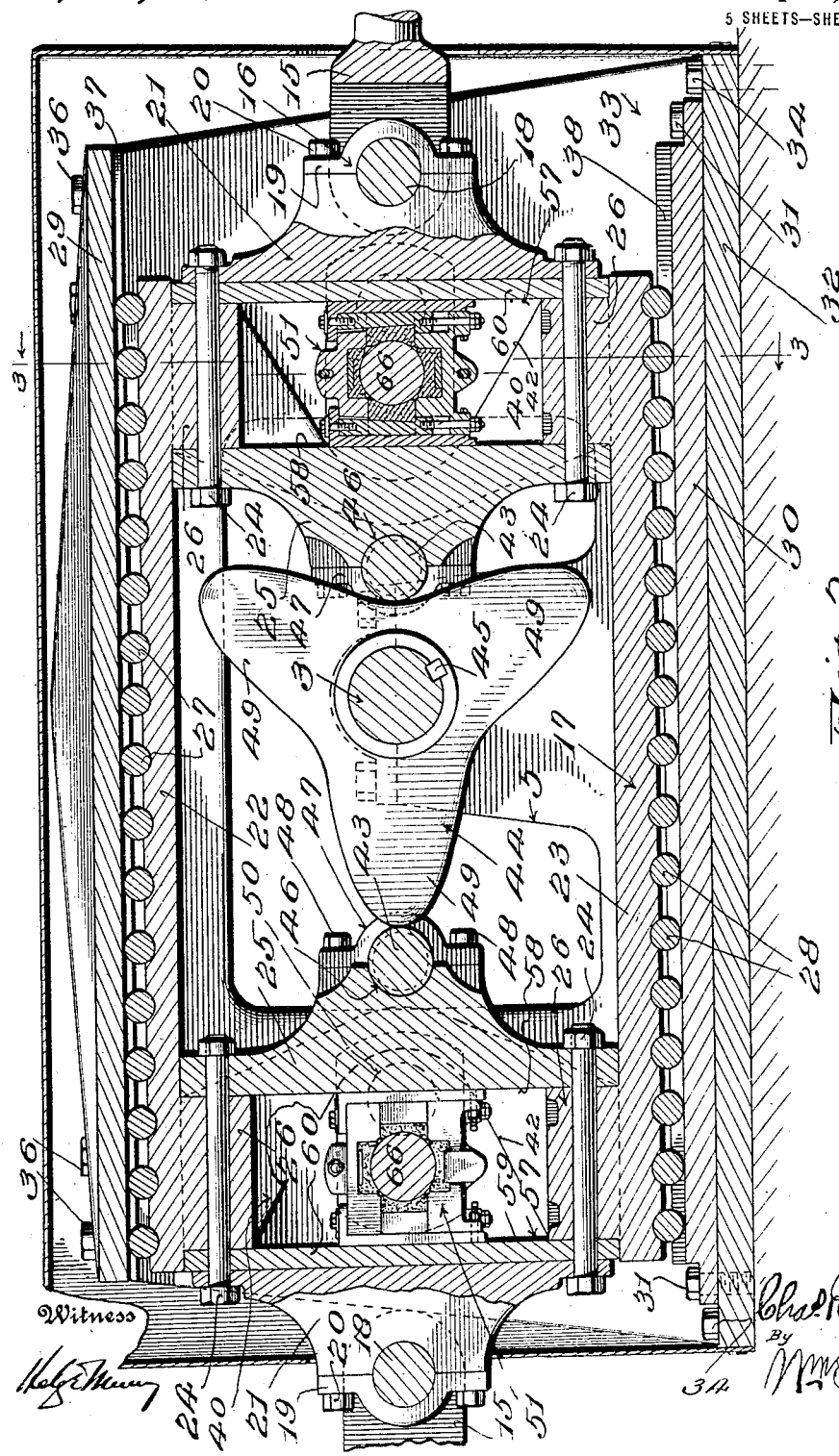

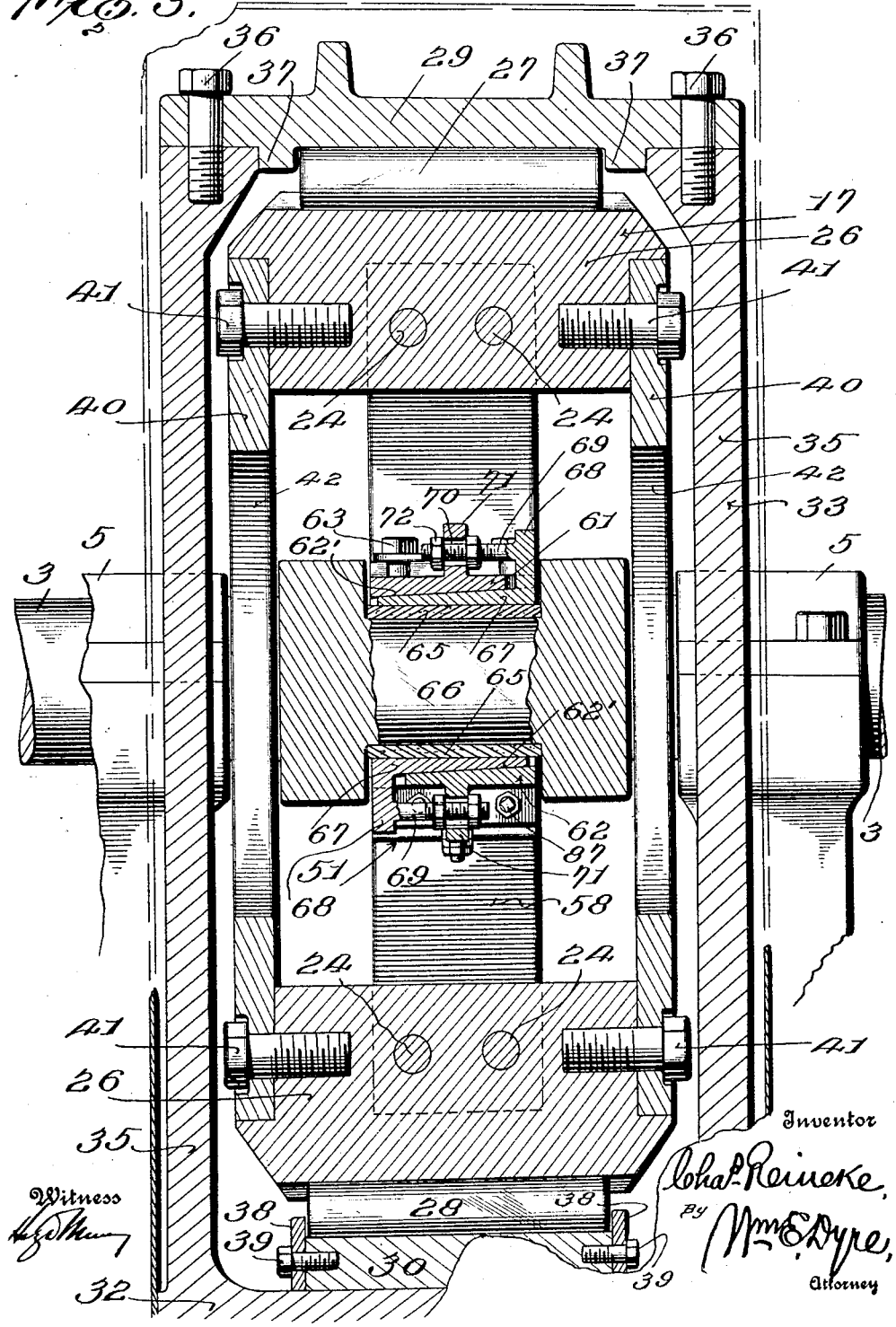

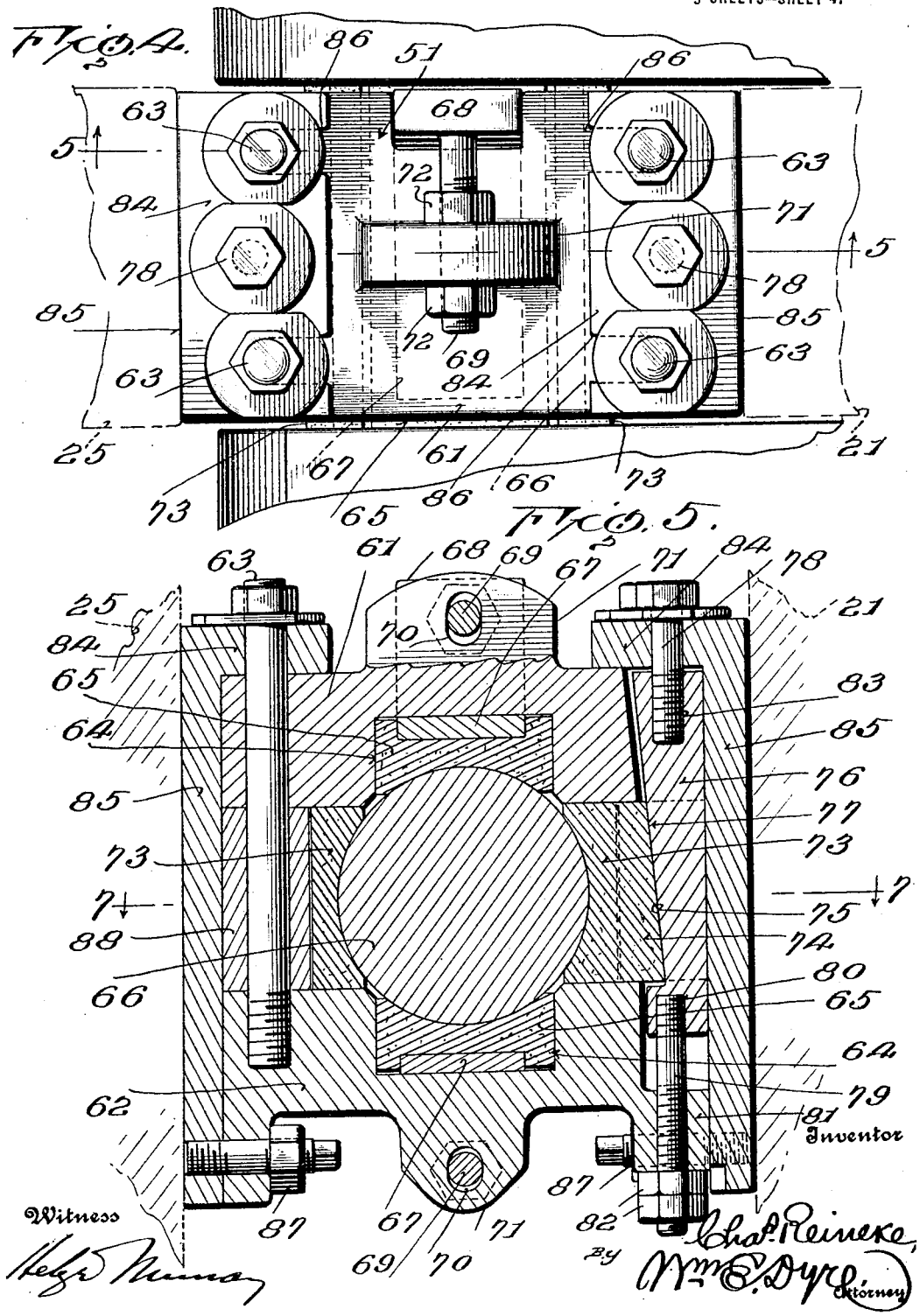

UNITED STATES PATENT OFFICE.

CHARLES REINEKE, OF NEW YORK, N. Y.

REDUCTION AND MULTISTROKE POWER-TRANSMITTING MECHANISM.

1,411,517.   Specification of Letters Patent.   Patented Apr. 4, 1922.

Application filed March 7, 1921. Serial No. 450,309.

*To all whom it may concern:*

Be it known that I, CHARLES REINEKE, a citizen of the United States, residing at New York, in the county of New York and State of New York, have invented certain new and useful Improvements in Reduction and Multistroke Power - Transmitting Mechanism; and I do hereby declare the following to be a full, clear, and exact description of the invention, such as will enable others skilled in the art to which it appertains to make and use the same.

This invention relates to power transmitting mechanism of a type set forth in a companion application bearing Serial Number 450,308, filed March 7th, 1921.

An object of the present invention is to produce a reduction device wherein the power strokes of a plurality of relatively high speed engines are effectively reduced and transmitted to a slow moving rotary element.

Another object of this invention is the production of a power installation wherein a series of relatively high speed engines is associated with a reduction mechanism, means being provided between the respective engines and reduction mechanism whereby one or more of the engines can be engaged or disengaged from the installation and utilized to operate lighter mechanism disassociated with the aforesaid reduction mechanism.

A further object of the invention is to provide a novel cross head mechanism in which some of the engines of the installation can be directly connected to movable bearings provided therein, and other of said engines interconnected with the said cross head by means of connecting rods.

A still further object of the invention is to provide a novel bearing movably positioned in a reciprocating cross head, together with means for adjusting said bearing when in position within the cross head.

With these and other objects in view the invention further consists in the construction and arrangement of a comparatively simple and durable mechanism capable of being easily installed and readily repaired as more fully hereinafter described and pointed out in the appended claims.

In the accompanying drawings illustrating an embodiment of my present mechanism as installed for use in connection with the power unit of a ship:—

Figure 1 is a view illustrating in plan a layout of a plurality of relatively high speed engines associated with the propeller shaft of a ship, and arranged for connection with other auxiliaries, such as pumps and dynamos for example;

Figure 2 is an enlarged vertical sectional view through the reduction mechanism illustrating more particularly the reciprocating cross head and associated power receiving shaft;

Figure 3 is a vertical transverse sectional view on the line 3—3 of Figure 2;

Figure 4 is a top plan view of one of the adjustable bearings provided on the cross head;

Figure 5 is vertical sectional view of said bearing taken on the line 5—5 of Figure 4;

Figure 6 is a bottom plan view of the aforesaid adjustable bearing;

Figure 7 is a horizontal sectional view taken on the line 7—7 of Figure 5; and

Figure 8 is a detail perspective view of the bearing blocks, illustrating in dotted lines one of the filler blocks, associated therewith.

The present invention has been primarily designed for use on ships, although it will be understood that it can be incorporated in various other power installations. Its use in connection with shipping is desirable for the reason that all of the power units necessary to the propulsion and control of the ship, together with the cargo handling mechanism, can be incorporated into a single power unit.

The present embodiment therefore of my invention has been chosen as illustrative of its use in a ship, wherein a plurality of relatively high speed engines of the explosive type are interconnected with my improved reduction and power distributing mechanism. It will be understood that all of these engines can be utilized for purposes of propelling the ship, or as occasions require certain of the engines may be disconnected from the propulsion reduction mechanism, and used to drive other auxiliaries, such for example as cargo handling devices, dynamos or pumps.

Generally stated, my invention includes a reduction mechanism interconnected with a series of internal combustion engines of relatively high speed, all of said engines being detachably associated with the aforesaid reduction mechanism, and capable of being interchangeably used for driving the ship, or other auxiliary devices as will more fully hereinafter appear. The reduction mechanism comprises a novel reciprocating cross head or sliding carriage to which certain of the engines are directly connected by means of a crank shaft, and other of said engines being further connected to said cross head through connecting rods. An adjustable bearing of novel construction is also provided on the cross head and provides for the direct connection of certain of the engines thereto.

Referring to the drawings wherein similar reference characters designate corresponding parts in the several views, series of engines 1—1 and 2—2 are alined adjacent an intermediate propeller shaft 3. The shaft 3 may be provided with the usual thrust bearings 4 and is further supported in suitable bearings 5 as shown. Another series of internal combustion engines 6—6 and 7—7 is arranged adjacent the aforesaid engines. These engines 6—6 and 7—7 are respectively alined as shown, intermediate crank shafts 8 and 9 connecting the same for operation in unison. These crank shafts are mounted in suitable bearings 10, and at each end are provided with clutch connections whereby the respective engines can be operated singly or in unison as desired.

Each engine 6 is connected to its respective crank shaft by means of a clutch 11, and the engines 7—7 are similarly connected to the aforesaid crank shafts by means of clutches 12.

Each of the engines 7—7 is further connected to suitable mechanism by means of clutches 13, said mechanism being for example, dynamos, illustrated diagrammatically at 14.

Connecting rods 15 are attached to one end of the respective crank shafts 8 and 9, and at their other end are secured at 16 to the opposite ends of the reciprocating cross head or sliding carriage 17. This connection 16 is in the form of a pin 18 held in place by a cap bearing 19 secured by bolts 20 to the end wall or frame 21 of the cross head. (See Fig. 2).

The reciprocating cross head 17 is formed of top and bottom members 22 and 23, respectively, secured to the end walls 21 by means of bolts 24. Intermediate roller shaft supports 25 are also secured by means of bolts 24 to projections 26 extending from the top and bottom members respectively. Series of roller or other anti-frictional bearings 27 and 28 are interposed between the top and bottom members of the cross head and respective top and bottom guide plates 29 and 30. The bottom guide plate 30 is secured by means of bolts 31 to the base 32 of a bracket 33. The bracket 33 may in turn be secured by means of bolts 34 to any suitable base or foundation. Secured to the upstanding arms 35 of the bracket 33 is the top guide plate 29, bolts 36 serving to effect this connection.

The upper series of roller bearings 27 is retained in place by depending flanges 37 provided on the top plate 29. Suitable guide plates 38 are secured by means of bolts 39 to the bottom guide plate 30, and serve to retain the series of roller bearings 28.

In addition to the top, bottom and end members of the cross head, side arms 40 are provided. These side arms are secured by means of bolts 41 to the respective projecting portions 26 of the top and bottom members 22 and 23. They are provided with intermediate slotted or open portions through which extends the propeller shaft 3, and recesses 42 are provided to permit free reciprocation.

Rotatably supported in the cross head are roller shafts 43, the said roller shafts being cooperatively associated with a reduction cam 44 keyed to the propeller shaft 3 at 45. The roller shafts 43 are mounted in bearings 46 provided on the intermediate supports 25 hereinbefore referred to. Cap bearings 47 are secured by bolts 48 to the side arms of the cross head, and serve to retain the roller shafts 43 in position for co-action with the cam 44. The roller shafts 43 are horizontally alined with the propeller shaft 3 and as each reciprocation of the cross head is imparted by the engines, the projecting arms 49 of the cam are moved by the roller shafts and the propeller shaft is rotated.

The present arrangement of reduction cam provides for a one-third reduction in the reciprocatory power strokes of the engine, so that the speed of rotation of the propeller shaft is reduced to one-third of that of the engines.

Other engines, namely those hereinbefore referred to as 1—1 and 2—2, are connected to the cross head 17. This connection consists of crank shafts 50 directly connected to movable bearings 51 provided at each end of the cross head. The crank shafts 50 are supported in stationary bearings 52 provided on any suitable support, and at each end are provided with respective clutch connections 53—53 and 54—54. Engines 2—2 which are connected with the crank shafts 50 by means of the clutches 54—54, may be further connected to other auxiliary apparatus such for example as pumps indicated diagrammatically at 55. Clutches 56 provided on each engine 2—2 serve to effect this connection.

The movable bearings 51 provided in cross head 17 for each of the crank shafts 50, are of novel construction and will now be described. These bearings are movable in vertical guideways 57, one face 58 of the support 25 forming one of the guides, and the inner face 59 of a guide plate 60 forming the other guide for said bearings. This guide plate 60 is retained in place by means of bolts 24, and may be replaced when worn, as will be understood.

Referring to Figures 4 to 8 inclusive, the movable bearing 51 is shown as composed of oppositely arranged bearing members 61 and 62 secured together by means of bolts 63. Each of these members is provided with a recess 64 into each of which are fitted bearing blocks 65. These bearing blocks fit against the pin 66 of the crank shaft as will be understood.

Cooperatively associated with the bearing blocks 65 are wedges 67, one arranged above and the other below the crank pin as shown in Figure 3. Each wedge is provided with a projection 68 from which latter extends a screw threaded rod 69. The rod 69 extends through a slotted opening 70 formed in a centrally located lug 71, and is provided with retaining and adjusting nuts 72 as shown. The lug 71 is formed integral with each member 61 and 62 respectively, of the bearing, the opposed faces of said members 61 and 62 being inclined as shown at 62' for cooperation with the wedge 67. By this construction it will be seen that the respective bearing blocks 65 can be properly adjusted around the crank pin 66.

Cooperatively associated with the bearing blocks 65 are other oppositely arranged bearing blocks 73 (see Figures 5 and 6). Each of the bearing blocks 73 is provided with an offset portion 74 the outer face of which is tapered as at 75 (see Figure 8). Cooperating with the tapered or beveled surface 75 of these bearing blocks 73 are wedges 76, each of said wedges having an inclined face 77 for co-action with the tapered face 75 of the bearing block.

The wedges 76 are adjustably positioned against the bearing blocks 73 by means of the screw-bolt connections 78 and 79, respectively. The screw-bolt connection 79 is carried by the bearing member 62, and is threaded into one end of the wedge 76 as shown at 80. The opposite end of the screw-bolt extends through a projection 81 carried by the bearing member 62, and receives the retaining and adjusting nuts 82. The upper screw-bolt connection 78 comprises a cap screw, the end of which is threaded into the wedge 76 as at 83. This cap screw passes through an angular extension 84 formed on a retaining or side bearing member 85. There are two of these clamping or retaining members 85, each serving to cooperate with the bearing faces 58 and 59 formed in the cross head. Each angular projection 84 of the respective members 85 is slotted as at 86 for purposes of assembling as will be understood. By this construction of screw bolt adjustment it will be seen that the wedges 76 can be cooperatively adjusted against the bearing blocks 73 for properly positioning said blocks against the crank pin.

The retaining side members 85 are secured to the bearing members 62 by means of bolt and nut connections 87, thereby further stabilizing the bearing as a unit and at the same time permitting of its ready disassembling. Suitable filler blocks 88 may be interposed adjacent the offset portion 74 of the bearing members 73 and further serve to complete the bearing. The assembling bolts 63 are designed to pass through these filler blocks as shown.

In practice it is desirable to assemble the reduction apparatus so that at least two co-operating cam reduction elements and associated cross heads are relatively positioned about the working shaft. When so assembled it will be understood that the reduction cams are set in angular relation to each other to prevent the engines hanging on dead center. In the present embodiment I have shown two reduction cams, although it will be understood others, or in some instances one may be used.

In operation, and assuming that all of the eight engines shown in the drawings are desired to operate the shaft 3, it will be seen that the successive power strokes from the respective engines 6—6 and 7—7 will be imparted through the connecting rods 15 to the reciprocating cross heads 17, and that the successive power strokes of the respective engines 1—1 and 2—2 will be imparted directly through the respective cranks 50 to the aforesaid cross heads 17. The movement of the cross heads 17 serves to force the roller shafts 43 against the projections on the reduction cams 44, thereby revolving the shaft 3 to which the aforesaid cams are keyed. These successive power strokes of the cross heads are converted and at the same time reduced to relatively slow rotary motion. It is this reduction in speed that is desirable for ship propulsion, and the utilization of relatively high speed internal combustion engines can be successfully used with this type of apparatus.

Assuming an installation wherein the engines 1—1 and 2—2 and 6—6 are of 1000 horse-power, and the engines 7—7 500 horse-power, together with the assumption that each of the aforesaid engines is designed for a speed of 240 revolutions per minute, it will be seen that a varied coupling of these engines to the reduction mechanism can be obtained through the various clutch devices hereinbefore described. By such a selection it will be possible for instance, to disconnect the engines 7—7 from the reduction apparatus by operating the clutches 12, and clutching them for operation with the dynamos 14, thereby generating the necessary electric current for use aboard ship. These motors being of smaller horse-power, it will be obvious that an economy would be thereby accomplished.

It will also be obvious that engines 2—2 can be disconnected from the reduction and propulsion mechanism by operating the clutches 54. In turn these said engines 2—2 may be clutched to suitable pumping apparatus by operating the clutches 56. Various other apparatus, such for instance as operating winches and similar devices for the handling of cargo can be substituted for the pumps and dynamos herein referred to. I do not limit myself to the application of this power unit to these only.

From the foregoing it will be obvious that a substantial economic distribution of the power generated by the relatively high speed internal combustion engines, as well as the reduction in speed may be effected. The several parts incident to this power installation are of substantial and heavy construction, and the motion imparted from the relatively high speed engines will be evenly received through the cam reduction devices or otherwise distributed as occasion may require.

I claim:

1. The combination with a plurality of relatively high speed engines each having a crank, of a slow speed shaft, a reciprocating cross head transversely movable with respect to said shaft, a cam provided on said slow speed shaft and arranged to engage the said cross head for receiving and converting the power strokes of each engine into rotary motion, and means including a movable bearing for connecting each of said cranks with the reciprocating cross head.

2. The combination with a plurality of relatively high speed engines each provided with a crank, of a slow speed shaft, a reciprocating cross head transversely movable with respect to said shaft, means provided on said shaft for receiving and converting the reciprocating power strokes of the engines into relatively slow rotary motion, means including a vertically movable bearing for connecting each of said cranks with the reciprocating cross head, and means for disconnecting one or more of said engines.

3. The combination with a plurality of relatively high speed engines each having a crank of a slow speed shaft, a reciprocating cross head associated with said shaft, means provided on said shaft for receiving and converting the reciprocating power strokes of the engines into relatively slow rotary motion, means including a movable bearing connecting each of the aforesaid cranks with the reciprocating cross head, and means including a clutch provided between each engine and the aforesaid connecting means whereby either engine can be operatively connected with or disconnected from the aforesaid cross head.

4. The combination with a plurality of relatively high speed engines each having a crank, of a slow speed shaft, a reciprocating cross head associated with and arranged to surround said shaft, a movable bearing provided in said cross head, said bearing being connected to said crank, and means provided on said shaft and engaging the cross head for converting the relatively high speed reciprocatory power strokes of the engines into relatively slow rotary motion.

5. The combination with a plurality of relatively high speed engines each having a crank, of a slow speed shaft, a reciprocating cross head associated with and arranged to surround said shaft, a movable bearing provided in said cross head, said bearing being connected to said crank, means provided on said shaft and engaging the cross head for converting the relatively high speed reciprocatory power strokes of the engine into relatively slow rotary motion, and means including a plurality of connecting rods for connecting some of said engines to said cross head.

6. The combination with a plurality of relatively high speed engines each having a crank, of a slow speed shaft, reciprocating cross heads associated with said shaft, a cam provided on said shaft and arranged to engage one of the cross heads for converting certain of the reciprocatory high speed power strokes of some of the engines into relatively slow rotary motion, another cam angularly associated with the aforesaid cam for engaging another of said cross heads for converting the remainder of the reciprocatory high speed power strokes of the other engines into relatively slow rotary motion, and means for connecting each of the aforesaid cranks to the respective reciprocating cross heads.

7. The combination with a plurality of relatively high speed engines each having a crank, of a slow speed shaft, reciprocating cross heads associated with said shaft, a cam provided on said shaft and arranged to engage one of the cross heads for converting certain of the reciprocatory high speed power strokes of some of the engines into relatively slow rotary motion, another cam angularly associated with the aforesaid cam for engaging another of said cross heads for converting the remainder of the reciprocatory high speed power strokes of the other engines into relatively slow rotary motion, means for connecting each of the aforesaid cranks to the respective reciprocating cross heads, and means including a clutch whereby one or more of the engines can be disconnected from the reciprocating cross heads.

8. The combination with a plurality of oppositely disposed and alined relatively high speed engines, of a slow speed shaft, reciprocating cross heads associated with said shaft, means provided on said shaft and engaging the cross heads for converting the relatively high speed reciprocatory power strokes of the engines into relatively slow rotary motion, means including crank connections extending from certain of the alined engines and directly connecting the cross heads with said engines and means including a plurality of connecting rods connecting the other alined engines with the cross heads.

9. The combination with a relatively high speed engine of a slow speed shaft, a reciprocating cross head associated with said shaft, means provided on said shaft for engaging the cross head for converting the relatively high speed reciprocatory power strokes of the engine into relatively slow rotary motion, means including a crank connection for directly connecting said engine with the cross head, and a bearing provided in the cross head for said crank.

10. The combination with a relatively high speed engine of a slow speed shaft, a reciprocating cross head associated with said shaft, means provided on said shaft for engaging the cross head for converting the relatively high speed reciprocatory power strokes of the engine into relatively slow rotary motion, means including a crank connection for directly connecting said engine with the cross head, and an adjustable bearing for said crank arranged in the aforesaid cross head.

In testimony whereof I affix my signature, in presence of two subscribing witnesses.

CHARLES REINEKE.

Witnesses:
W. H. CAMPBELL.
JAMES A. LYNCH.